United States Patent [19]

Balland

[11] Patent Number: 5,352,955
[45] Date of Patent: Oct. 4, 1994

[54] HIGH ENERGY IGNITION GENERATOR FOR GAS TURBINES

[75] Inventor: Patrick Balland, Rueil Malmaison, France

[73] Assignee: EYQUEM, Nanterre Cedex, France

[21] Appl. No.: 948,310

[22] Filed: Sep. 22, 1992

[30] Foreign Application Priority Data

Sep. 27, 1991 [FR] France .................... 91 11933

[51] Int. Cl.⁵ .............................. H05B 37/02
[52] U.S. Cl. .................. 315/209 R; 315/209 CD; 315/209 M; 361/247
[58] Field of Search ....... 315/209 CD, 209 R, 209 M; 60/398; 361/247

[56] References Cited

U.S. PATENT DOCUMENTS

| | | | |
|---|---|---|---|
| 3,715,650 | 2/1973 | Draxler | 315/209 SC |
| 4,983,886 | 1/1991 | Balland | 315/209 CD |
| 5,163,411 | 11/1992 | Koiwa et al. | 315/209 CD |
| 5,245,252 | 9/1993 | Frus et al. | 315/209 CD |

FOREIGN PATENT DOCUMENTS

| | | |
|---|---|---|
| 846643 | 8/1952 | Fed. Rep. of Germany . |
| 2606890A1 | 8/1977 | Fed. Rep. of Germany . |
| 7228327 | 3/1973 | France . |
| WO90/10154 | 9/1990 | PCT Int'l Appl. . |
| 499927 | 1/1971 | Switzerland . |

*Primary Examiner*—Robert J. Pascal
*Assistant Examiner*—Reginald A. Ratliff
*Attorney, Agent, or Firm*—Wenderoth, Lind & Ponack

[57] ABSTRACT

A high energy ignition generator includes an energy source connected to a circuit for charging an energy storage capacitor. The storage capacitor is connected to a discharge circuit consisting of a series inductive circuit for energy recovery and an ignitor having terminals to which are connected freewheel diodes. Sparks are generated between the electrodes of the ignitor, by the discharge of the capacitor in the igniter through the inductive circuit for energy recovery and by the discharge of the inductive circuit in the igniter through the freewheel diodes. The inductive circuit includes at least two inductors. The at least two inductors are connected in series with the capacitor at the time of its discharge and are connected in parallel with the terminals of the igniter at the time of their discharge.

6 Claims, 2 Drawing Sheets

HIGH ENERGY IGNITION GENERATOR FOR GAS TURBINES

BACKGROUND OF THE INVENTION

The present invention relates to a high energy ignition generator for gas turbines.

A certain number of generators of this type are already known in the art, and which generators comprise an energy source connected to a circuit for charging an energy storage capacitor and means for connection of this capacitor to a discharge circuit comprising an inductive means for energy recovery connected in series with an igniter having terminals to which are connected freewheel diodes, so as to generate sparks between the electrodes of the igniter, by the discharge of the capacitor in the igniter through the inductive means for energy recovery and by the discharge of the inductive means in the igniter through the freewheel diodes.

For example reference may be made to French Application No. FR-A-2,636,678 for a more complete description of the operation and the control of this type of generator.

In this type of generator, the connection means are constituted by a conventional discharger or by a controlled semiconductor commutation means, such as thyristors, as is the case in the previously mentioned application.

However, in the latter case, the presence and dimensioning of the inductive means become critical with respect to these thyristors.

In fact, at the time of the Commutation of the latter, one factor which is important with respect to the reliability of the whole arrangement is limiting the growth of current in these thyristors and the losses on commutation.

Therefore, the use of these thyristors has hitherto been conditioned by a limit of the peak power of the spark between the electrodes of the igniter.

In fact, the choice of inductive means resulted in a compromise between the need to have a high inductance to sufficiently limit the growth of the current and the need to have a low inductance to obtain a large spark power.

It is clear that this does not allow optimal operation of the generator.

SUMMARY OF THE INVENTION

The object of the present invention is therefore to solve these problems by providing a generator which is simple and reliable, and which makes it possible to obtain an optimal spark power.

For this purpose, the subject of the present invention is a high energy ignition generator for gas turbines, of the type described previously, wherein the inductive means comprises at least two inductors and in that there are provided means for connection of the at least two inductors in series with the capacitor at the time of its discharge and in parallel with the terminals of the igniter at the time of their discharge.

Advantageously, the two inductors are disposed on either side of the igniter and the connection means comprise two freewheel diodes, each connected in parallel with a series combination of the igniter and one of the two inductors.

BRIEF DESCRIPTION OF THE DRAWINGS

The invention will be better understood with the help of the description which is to follow, given solely by way of example and made with reference to the attached drawings, in which.

DESCRIPTION OF THE PREFERRED EMBODIMENTS

Figure 1:
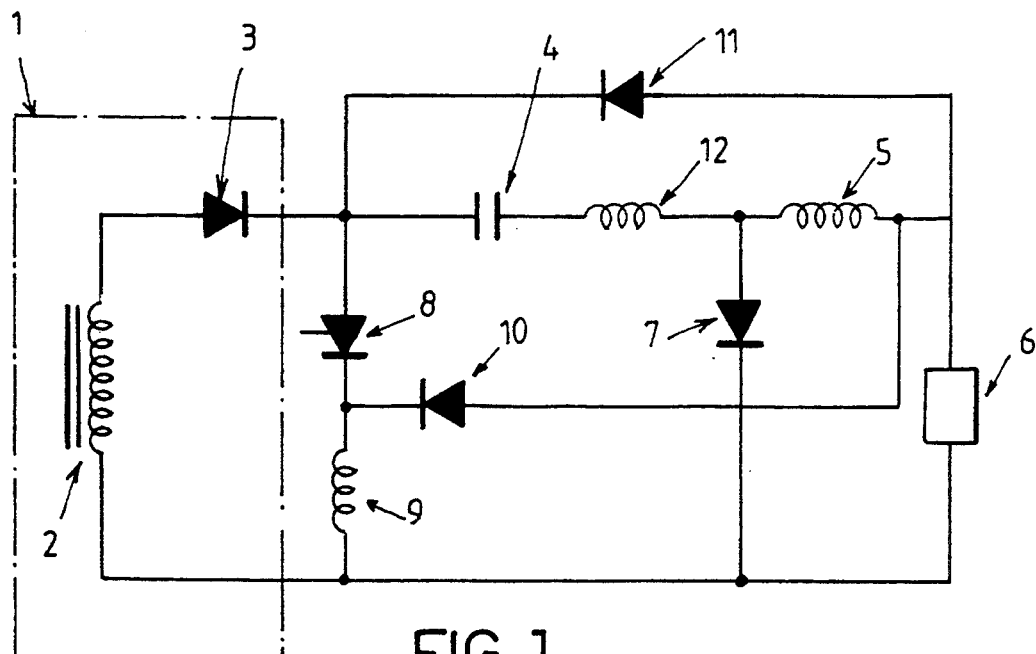
FIG. 1 represents a block diagram of a first embodiment of an ignition generator according to the present invention.

As can be seen in FIG. 1, which represents a first embodiment of a generator according to the present invention, the latter comprises a conventional energy source designated by the general reference 1 comprising, for example a transformer 2 associated with diode rectifying means 3.

The positive terminal of this energy source is connected to one terminal of an energy storage capacitor 4, the other terminal of the energy source capacitor is connected to one terminal of a first inductor 5.

The other terminal of this inductor 5 is connected to a first terminal of an igniter 6 having a second terminal which is connected to the negative terminal of the supply source.

A first freewheel diode 7 is connected in parallel with the series combination of the first inductor 5 and the igniter 6 in order to allow charging of the capacitor 4, A connection means, designated by the reference numeral 8 in this figure, is also provided. Their operation will be described in more detail hereinbelow.

It will be noted, however, that the connection means comprises, for example, thyristor components.

One terminal of the connection means is connected to the positive terminal of the energy source and a second inductor 9 is connected between the other terminal of the connection means 8 and the second terminal of the igniter 6.

Another freewheel diode 10 is connected in parallel with the series combination of the igniter and the second inductor 9.

A third freewheel diode 11 is connected in parallel with the series combination of the capacitor 4 and the first inductor 5, as will be described in more detail hereinbelow, to drain the energy stored by the parasitic inductance of this capacitor.

It is clear therefore that the capacitor 4 is charged by the supply voltage of the energy source 1 through the freewheel diode 7.

Once this charging has been carried out, and as is described in more detail in the previously mentioned application, the connection means 8 is triggered to generate sparks between the electrodes of the igniter, firstly by discharge of the capacitor 4 in the igniter 6 through the inductive means for energy recovery 5 and 9, and secondly by discharge of the inductive means 5 and 9 in the igniter 6 through the corresponding freewheel diodes 7 and 10, this discharge resulting from the application of LENZ's law, in a manner which is known per se.

Whereas in the prior art generator, a single inductor is used, in the generator according to the present invention, at least two inductors are used one above and inductors being connected in series on either side of the igniter and a means is provided for connection of these two inductors, firstly in series with the capacitor 4 at the time of its discharge in the igniter following triggering of the connection means, and secondly in parallel with the terminals of the igniter 6 at the time of the inductors discharge in the igniter 6.

It is clear that the fact of connecting the two inductors 5 and 9 in series with the capacitor, the igniter and the connection means at the time of the discharge of the capacitor, makes it possible to obtain a limited growth of the current in this circuit and in particular in the thyristor connection means. These thyristors in fact only sustain a limited value of current growth.

In the second previously described phase, the inductors are connected in parallel with the terminals of the igniter, by virtue of freewheel diodes 7 and 10, a voltage opposite to that applied in the first phase appearing at the terminals of these inductors by the application of LENZ's law, which makes it possible to obtain a spark power which is improved with respect to the prior art generators with a single inductor.

Figure 3:
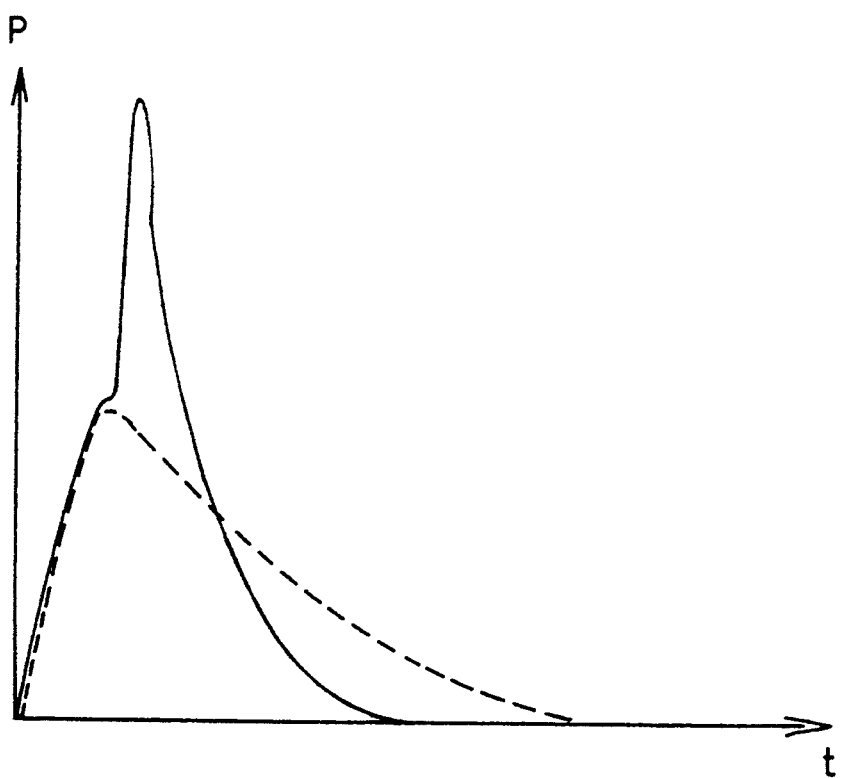
FIG. 3 illustrates the power obtained at the terminals of the igniter as a function of time, using a state of the art generator and using a generator according to the present invention.

Reference may, in fact, be made to FIG. 3 to note that if two inductors of unit inductance corresponding approximately to half the inductance of an inductor used in the prior art are used, a peak spark power at the terminals of the igniter is obtained which is approximately equal to twice that obtained using a generator with a single inductor.

Returning to FIG. 1, it may also be noted that a third inductor designated by the reference 12 in this figure, and constituted at least in part by the parasitic inductance of the capacitor, is connected in series with the latter, which makes it possible further to improve the operation of the generator.

It is clear therefore that the generator according to the invention makes it possible to deliver a peak spark power which is greater than that delivered by the prior art generators and in particular those using thyristors as connection means, while keeping the same dynamic load in di/dt of the critical components, such as the capacitor and the thyristors.

It will be noted that in the case in which the two inductors used have an inductance equal to half the inductance of the inductor used in the prior art generators, the peak current IC in the igniter is approximately twice as large as that delivered by a state of the art generator.

It will also be noted that the effect of the parasitic inductances of the circuits is to recharge the storage capacitor 4 in reverse.

If asymmetric thyristors are not used in the connection means, that it is to say thyristors which have one reverse biased diode, this reverse charging can be retransmitted to the circuits.

The freewheel diode 11 allows this charge to flow away and the circuits to be protected.

It will also be noted that the different inductors can be wound on each other or on the same support because since the value of the mutual induction is proportional to the square of the number of turns and to the internal diameter of these inductors, an overall lower number of turns will be required in order to obtain the same inductance than when using separate inductors.

Moreover, this also allows a saving in bulk and a reduction in resistive losses.

Figure 2:
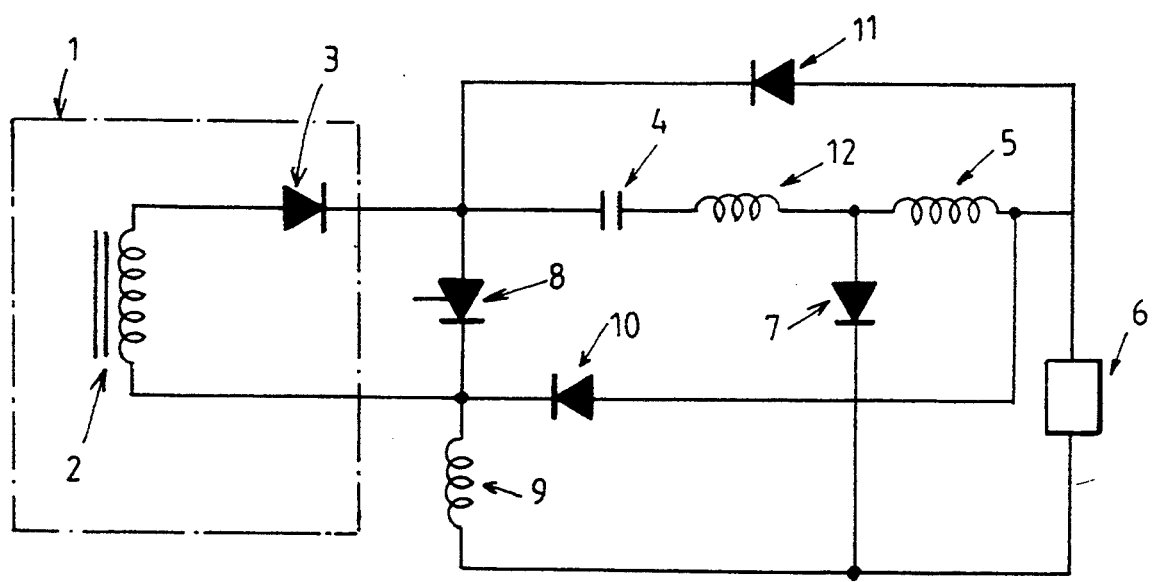
FIG. 2 represents a block diagram of a second embodiment of an ignition generator according to the present invention.

In the second embodiment represented in FIG. 2, the components identical to those used in FIG. 1 carry the same reference numbers.

It may be noted that this embodiment has an identical circuit diagram to the first embodiment with the exception of the fact that whereas in the first embodiment the negative terminal of the supply source is connected to the point midway between the second inductor 9 and the igniter 6, in the second embodiment represented in the FIG. 2, the negative terminal of the supply source is connected to the point midway between the connection means 8, the freewheel means 10 and the second inductor 9 below the igniter.

The first embodiment makes it possible to obtain a reference potential which is common to the igniter.

The device according to the invention therefore enables the constraints on the various components used to be reduced, the efficiency to be improved by reducing the losses as a result of the Joule effect and the modulation of the respective inductances of the inductors makes it possible to achieve a good compromise between the peak power and the duration of the spark.

According to yet another embodiment, the positions of the capacitor 4 and the thyristor 8 can be swapped, which makes it possible to obtain a circuit with reversed output polarity. Of course, in this case, the freewheel means must be reversed.

In the first two embodiments described, the charging of the capacitor is ensured through a freewheel diode whereas in the last embodiment the capacitor is directly connected to the energy source.

I claim:

1. A high energy ignition generator for gas turbines comprises and energy source connected to a circuit for charging an energy storage capacity and connection means for connecting said capacitor to a discharge circuit comprising in series two inductors for energy recovery and an igniter, one of said two inductors being connected on one side of said igniter and the other of said two inductors being connected on the other side of said igniter, and two freewheel means, one of said freewheel means being connected in parallel with a series combination of one of said inductors and said igniter and the other of said freewheel means being connected in parallel with a series combination of the other of said inductors and said igniter, so as to generate sparks between electrodes of said igniter by discharge of said capacitor in said igniter through said two inductors for energy recovery and by discharge of said two inductors in said igniter through said two freewheel means, wherein said two inductors are connected in series with said capacitor at the time of said capacitor's discharge and are connected in parallel with said igniter at the time of said inductors' discharge.

2. A generator according to claim 1, wherein said connection means comprises a controlled semiconductor commutation means and wherein another freewheel means is connected in parallel with a series combination of said capacitor and one of inductors.

3. A generator according to claim 2, wherein said controlled semiconductor commutation means comprises at least one thyristor.

4. A generator according to claim 2, wherein a third inductor formed at least in part by parasitic inductance of said energy storage capacitor, is connected in series with said energy storage capacitor.

5. A generator according to claim 1, wherein each freewheel means comprises at least one diode.

6. A generator according to claim 1, wherein said two inductors are wound on the same support.

* * * * *